United States Patent [19]
Sayler

[11] Patent Number: 4,551,092
[45] Date of Patent: Nov. 5, 1985

[54] JET ENGINE DECONTAMINATION SYSTEM

[75] Inventor: William M. Sayler, Bradshaw, Md.

[73] Assignee: The United States of America as represented by the Secretary of the Army, Washington, D.C.

[21] Appl. No.: 550,855

[22] Filed: Nov. 14, 1983

[51] Int. Cl.⁴ .......................... F23J 3/00; F27B 21/00
[52] U.S. Cl. .......................... 432/32; 374/8; 432/2
[58] Field of Search .......... 374/6, 7, 124, 104, 374/164, 5, 8; 250/354.1; 134/45; 340/577; 432/2, 32

[56] References Cited

U.S. PATENT DOCUMENTS

| | | | |
|---|---|---|---|
| 2,615,973 | 10/1952 | Heath, Jr. ............................. | 374/6 |
| 3,542,995 | 11/1970 | Boone et al. ................... | 250/354.1 X |
| 3,596,241 | 7/1971 | Migneault ........................ | 134/45 X |
| 3,661,369 | 5/1972 | Costello ......................... | 219/354 X |
| 3,836,751 | 9/1974 | Anderson ........................ | 219/354 X |
| 3,947,235 | 3/1976 | Bornert ............................... | 432/2 |
| 4,176,554 | 12/1979 | Kazmierowicz ................. | 432/32 X |

FOREIGN PATENT DOCUMENTS

| | | | |
|---|---|---|---|
| 0016083 | 3/1927 | Netherlands ........................ | 134/90 |
| 0805081 | 2/1981 | U.S.S.R. .............................. | 374/111 |

Primary Examiner—Daniel M. Yasich
Attorney, Agent, or Firm—Anthony T. Lane; Robert P. Gibson; Michael C. Sachs

[57] ABSTRACT

Decontaminating an object such as a vehicle, is achieved by subjecting the object to an elevated temperature for a time sufficient to achieve the desired temperature. The heat source is preferably a jet engine which is supported for universal movement. The temperature of the surface of the object under treatment is determined by sensing the infrared radiation emanating from the surface of the object. In response to the attainment of a predetermined level of infrared radiation, an electric control member is used to regulate the movement of said heat source. Thus heating is caused to be directed at selected regions of the object under treatment for the time period necessary to attain the desired temperature level.

5 Claims, 1 Drawing Figure

JET ENGINE DECONTAMINATION SYSTEM

GOVERNMENT RIGHTS

The invention described herein may be manufactured, used and licensed by the Government for Governmental purposes without the payment to me of any royalties thereon.

BACKGROUND OF THE INVENTION

1. Field of the Invention

The invention relates to a system for decontaminizing Army vehicles which have been covered by a toxic agent as by an enemy attack during warfare, e.g. through the use of a jet engine exhaust plume to bring the vehicle surface to the desired decontamination temperature to destroy the chemical composition of the toxic agent by burning, e.g., so it cannot harm humans.

2. Brief Description of the Prior Art

It is considered necessary under certain circumstances to be able to provide optimum decontamination of Army vehicles. It takes a different amount of Calories to heat each particular spot on the vehicle to the same decontamination temperature (set number of degrees) for decontaminating a (particular) toxic agent. Since certain spots have different shapes, thicknesses, materials, sharp points, etc., they would all require different amounts of heat, or time, to assure they have been heated to the proper temperature. It is possible to survey, vehicle by vehicle, all the important spots and construct a temperature profile for vehicle. The inventor instead proposes a closed loop system for automatically heating each spot to the set temperature, sensing the reaching of the temperature, and automatically moving on to the next spot and so forth until the entire vehicle is done. The proposed art of decontamination of Army vehicles is being perfected by running simulant tests on each type, model and style of Army vehicles. They have used thermal couples, temperature dots (temperature dots turn black when temperature of dot is reached) and radiation thermometers to check the temperature of the vehicle. The hot engine exhaust is played onto the vehicle at different speeds to perfect the optimum time-temperature profile. However, they are considered to have problems and limitations. For example, in order to determine when the vehicle surface is decontaminated, temperature and time profiles must be run on each type, model and style of vehicle. Operators will have to be trained to conform with the time vs. temperatures developed in the testing of the different types, models and styles of vehicles. The IR radiation thermometer is now being used to find out the time and temperature profiles in some of their tests.

Among the difficulties associated with a heat treatment decontamination system, is the difficulty of determining when the surface being treated reaches the desired temperature. Not only do different vehicles have different contours, but also they are constructed of different materials and consequently exhibit differences in their thermal properties, such as conductance. It would appear that time and temperature profiles would have to be developed for at least each type of vehicle and perhaps for individual vehicles within a class. Operator skills would vary resulting in varying decontamination of vehicles.

SUMMARY OF THE INVENTION

It has now been found that vehicle decontamination can be achieved by means of a system in which a jet engine is employed as a heat source, a universal control mechanism directs the exhaust plume of the jet engine at the region under treatment and an infrared radiation detector senses the temperature of the surface under treatment.

The infrared detector sends a signal to a transducer which activates a control valve when a predetermined signal level is attained. The predetermined signal level must be empirically determined to correspond to the required surface temperature. As long as the control valve is in the "OFF" position, the hydraulic fluid recirculates to the reservoir. However, upon actuation of the control valve by the transducer, the proportional controller is activated and the operator can direct the heat emitted by the engine toward the body being subjected to the decontamination process.

BRIEF DESCRIPTION OF THE DRAWING

The objects and advantages of the invention will become apparent from the following description of the invention, particularly when read in conjunction with the drawing, wherein.

DESCRIPTION OF THE PREFERRED EMBODIMENTS INCLUDING THE BEST MODE OF OPERATION

Figure 1:
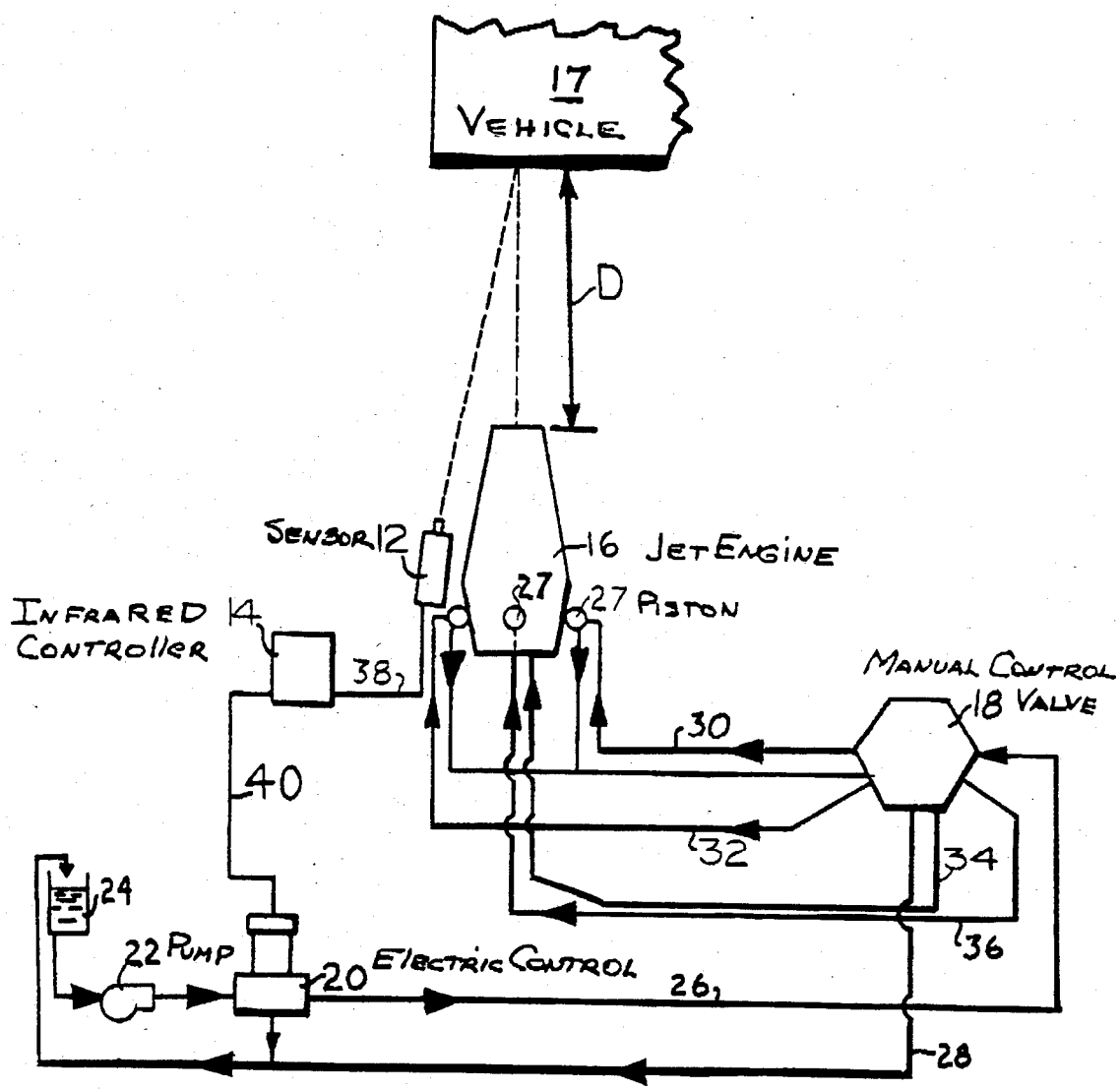
FIG. 1 is a schematic illustration of the system of the instant invention.

FIG. 1 illustrates the jet engine system for decontamination of Army vehicles. The system employs a jet engine 16 which is supported for universal (horizontal and vertical) movement. An infrared radiation sensor 12, designed to measure temperatures between 0 degrees Fahrenheit and 500 degrees Fahrenheit, is mounted on the jet engine 16 and directed so as to measure the temperature of the area on the contaminated object or vehicle 17 that is being heated by the engine exhaust. The radiation sensor 12 must be focused on the same area of the structure as is being heated by the exhaust. Therefore, the angle formed by the direction of view of the radiation sensor 12 and the direction of travel of the engine exhaust must be correlated with the distance between the heated surface and the radiation sensor 12.

The radiant energy emitted by a body is relative to its temperature. Since this energy falls primarily in the infrared spectrum, the intensity of the infrared radiation is a function of the object's temperature. The infrared sensor 12 responds to the temperature of the item being decontaminated by the jet engine 16. When the surface temperature of the item reaches a predetermined level, the infrared control 14 actuates the electric control 20, thereby activating the hydraulic pump 22.

The movement of the jet engine 16 can be produced through the use of a hydraulic system. As illustrated in the Figure, the hydraulic pump 22 draws the hydraulic fluid from the hydraulic tank reservoir 24 and pressurizes the fluid to a predetermined pressure level that will operate the hydraulic cylinders or pistons represented generally as 27. The hydraulic systems are well known in the art and therefore further details regarding the structure or operation of these components would be superfluous.

The hydraulic pump 22 is connected to the electric control 20 which will open or close the primary hydraulic line 26 which feeds the manual control valve 18 with hydraulic fluid under pressure. Only when the electric control 14 is in the open position, and the pressurized hydraulic fluid is in communication with the manual control valve 18, does the manual control valve 18 become operable. The manual control valve 18 controls the universal movement of the jet engine 16, that is, it provides the independent though simultaneous up or down and side to side movement. The manual control valve operates by controlling the hydraulic fluid flow through the hydraulic lines 30, 32, 34 and 36, each of which are connected to the aforenoted hydraulic cylinders. The hydraulic lines 34 and 36 produce the side to side (horizontal) movement, whereas the hydraulic lines 30 and 32, produce the up and down (vertical) movement. When the manual control 18 is in the neutral position and the electric control 20 is open, the hydraulic fluid under pressure will return to the tank reservoir 24 via the return line 28. When the electric control valve 20 is closed, the fluid under pressure returns directly to the hydraulic tank.

The electrical connection 38 interactively connects the infrared radiation sensor 12 on the infrared camera and the infrared control 14. Thus, the temperature values are provided to the infrared control 14. The electrical line 40 transmits the output voltage from the infrared control 14 to the electric control 20 thus providing for its operation.

The system of the instant invention overcomes the prior art problem relating to the difficulty of knowing when vehicles of different sizes and/or material reach their decontamination level. Through the utilization of the instant infrared system, the determination is made automatically. This reduces the required operator skill level and eliminates the need for tests which would otherwise be required to establish time/temperature profiles. In addition, the system of the instant invention provides assurance that the vehicle being treated reaches the decontamination temperature in the shortest possible time and without being subjected to unnecessary or excessive heat.

GLOSSARY

| Reference Number | Description |
| --- | --- |
| 12 | infrared radiation sensor |
| 14 | infrared controller |
| 16 | Jet engine |
| 17 | vehicle |
| 18 | manual control valve |

-continued

GLOSSARY

| Reference Number | Description |
| --- | --- |
| 20 | electric control |
| 22 | hydraulic pump |
| 24 | tank reservoir |
| 26 | primary hydraulic line |
| 27 | hydraulic pistons |
| 28 | return line |
| 30 | hydraulic line |
| 32 | hydraulic line |
| 34 | hydraulic line |
| 36 | hydraulic line |
| 38 | electrical connection |
| 40 | electric line |

What is claimed is:

1. A system for decontaminating a vehicle contaminated by contact with toxic substances by burning said substances off the surface of said vehicle, said system comprising:
   a. movable heating means for providing a universally movable source of high temperature heat for directing heat at a spot on said vehicle;
   b. infrared temperature detector means directed toward said spot on said vehicle currently being heated, responsive to infrared radiation therefrom for generating an output signal proportionate to the instantaneous temperature of said spot;
   c. transducer means, electrically connected to said detector means for activating controlling fluidic flow in response to attainment by the said spot of a predetermined temperature level;
   d. controlling means, fluidically connected to said transducer means for generating fluidic control signals to a means for moving said heating means to aim said heat to another spot; and
   e. said means for moving being fluidically coupled to said controlling means for causing said high temperature heat of said heating means to be moved to different spots on said vehicle for heating.

2. The decontamination unit of claim 1, wherein said heating means is a jet engine.

3. The decontamination unit of claim 1, further comprising hydraulic means for providing a source of pressurized hydraulic fluid and control valve means, wherein said transducer means causes said controlling means to be rendered operative in response to said transducer means by controlling the opening and closing of said control valve, thereby permitting hydraulic fluid communication between said controlling means, said source of pressurized hydraulic fluid and said means for moving.

4. The decontamination unit of claim 1 wherein said controlling means is a proportional flow controller.

5. The decontamination unit of claim 1 wherein said vehicle is an aircraft.

* * * * *